United States Patent
Shu et al.

(10) Patent No.: US 9,838,958 B2
(45) Date of Patent: Dec. 5, 2017

(54) METHOD AND DEVICE FOR NETWORK SELECTION FROM SHARED NETWORK

(71) Applicant: Huawei Technologies Co., Ltd., Shenzhen (CN)

(72) Inventors: Lin Shu, Shenzhen (CN); Yang Zhao, Shenzhen (CN); Mingzeng Dai, Shenzhen (CN); Dong Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/752,208

(22) Filed: Jun. 26, 2015

(65) Prior Publication Data
US 2015/0296449 A1 Oct. 15, 2015

Related U.S. Application Data

(63) Continuation of application No. PCT/CN2012/087917, filed on Dec. 28, 2012.

(51) Int. Cl.
*H04W 4/00* (2009.01)
*H04W 48/18* (2009.01)
*H04B 1/38* (2015.01)
*H04W 48/12* (2009.01)
*H04W 48/16* (2009.01)

(52) U.S. Cl.
CPC ............ *H04W 48/18* (2013.01); *H04B 1/38* (2013.01); *H04W 48/12* (2013.01); *H04W 48/16* (2013.01)

(58) Field of Classification Search
CPC .................................. H04B 1/38; H04W 48/18

USPC ....... 455/435.1–442, 420, 421, 422.1, 456.1, 455/456.2, 457, 452.1, 452.2; 370/328–338
See application file for complete search history.

(56) References Cited

U.S. PATENT DOCUMENTS

2002/0119774 A1  8/2002  Johannesson et al.
2004/0224684 A1* 11/2004  Dorsey ............... H04W 48/18
                                                  455/434

(Continued)

FOREIGN PATENT DOCUMENTS

CN       102137382 A     7/2011
WO    WO 2009/096496 A1  8/2009

OTHER PUBLICATIONS

LTE, "3rd Geheration Partnership Project; Technical Specification Group Services and System Aspects; Service Accessibility (Release 11)," Global System for Mobile Communications, 3GPP TS 22.011, V11.2.0, Dec. 2011, 26 pages.

(Continued)

*Primary Examiner* — Babar Sarwar
(74) *Attorney, Agent, or Firm* — Brinks Gilson & Lione

(57) ABSTRACT

The present invention relates to the field of communications. Provided in an embodiment of the present invention are a method and device for network selection from shared networks, realizing network selection when a UE accesses a shared cell. The method comprises: a UE receives a network selection instruction; and the UE selects a target network according to the network selection instruction. The embodiment of the present invention is used to select a network from shared networks.

12 Claims, 8 Drawing Sheets

(56) References Cited

U.S. PATENT DOCUMENTS

| | | | | |
|---|---|---|---|---|
| 2004/0224689 | A1* | 11/2004 | Raghuram | H04W 48/16 455/435.3 |
| 2005/0153722 | A1* | 7/2005 | Chou | H04W 48/18 455/512 |
| 2007/0184825 | A1* | 8/2007 | Lim | H04W 8/06 455/422.1 |
| 2009/0196265 | A1* | 8/2009 | Mariblanca Nieves | H04W 8/065 370/338 |
| 2010/0113010 | A1* | 5/2010 | Tenny | H04L 12/66 455/423 |
| 2010/0261473 | A1* | 10/2010 | Al-Bakri | H04W 8/02 455/435.2 |
| 2010/0261474 | A1* | 10/2010 | Gollapudi | H04W 48/18 455/435.3 |
| 2012/0077494 | A1* | 3/2012 | Kim | H04W 60/005 455/435.1 |
| 2012/0164979 | A1* | 6/2012 | Bachmann | H04L 63/164 455/411 |
| 2012/0302241 | A1 | 11/2012 | Klingenbrunn et al. | |
| 2012/0309391 | A1* | 12/2012 | Zhang | H04W 48/16 455/432.1 |
| 2013/0040634 | A1* | 2/2013 | Johansson | H04W 24/10 455/422.1 |
| 2014/0071944 | A1* | 3/2014 | Narasimha | H04W 36/0055 370/331 |
| 2014/0099912 | A1* | 4/2014 | Lee | H04W 48/08 455/404.1 |
| 2015/0156687 | A1* | 6/2015 | Wu | H04W 36/0083 455/436 |

OTHER PUBLICATIONS

"3$^{rd}$ Generation Partnership Project; Technical Specification Group Core Network and Terminals; Non-Access-Stratum (NAS) Functions Related to Mobile Station (MS) in Idle Mode (Release 11)," Global System for Mobile Communications, 3GPP TS 23.122, V11.4.0, Dec. 2012, 45 pages.

"3$^{rd}$ Generation Partnership Project; Technical Specification Group Radio Access Network; User Equipment (UE) Procedures in Idle Mode and Procedures for Cell Reselection in Connected Mode (Release 11)," Global System for Mobile Communications, 3GPP TS 25.304, V11-0-0, Sep. 2012, 52 pages.

"3$^{rd}$ Generation Partnership Project; Technical Specification Group Radio Access Network; Radio Resource Control (RRC); Protocol Specification (Release 11)," 3GPP TS 25.331, V11-40, Dec. 2012, 2056 pages.

LTE, 3Generation Partnership Project; Technical Specification Group Radio Access Network; Evolved Universal Terrestrial Radio Access (E-UTRA); User Equipment (UE) Procedures in Idle Mode,: Global System for Mobile Communications, 3GPP TS 36.304, V11.1.0, Sep. 2012, 33 pages.

LTE, "3$^{rd}$ Generation Partnership Project; Technical Specification Group Radio Access Network; Evolved Universal Terrestrial Radio Access Network (E-UTRAN); S1 Application Protocol (S1AP) (Release 11)," Global System for Mobile Communications, 3GPP TS 36.413, V11.2,0, Dec. 2012, 272 pages.

"3r$^{rd}$ Generation Partnership Project; Technical Specification Group GSM/EDGE Radio Access Network; Mobile Radio Interface Layer 3 Specification; Radio Resource Control (RRC) Protocol (Release 11)," Global System for Mobile Communications, 3GPP TS 44.018, V11.2.0, Sep. 2012, 458 pages.

* cited by examiner

METHOD AND DEVICE FOR NETWORK SELECTION FROM SHARED NETWORK

CROSS-REFERENCE TO RELATED APPLICATIONS

This application is a continuation of International Application No. PCT/CN2012/087917, filed on Dec. 28, 2012, which is hereby incorporated by reference in its entirety.

TECHNICAL FIELD

The disclosure relates to the field of communication, and particularly to a method and device for selecting a network from shared networks.

BACKGROUND

To deploy a wireless communication network, an operator needs to invest very high costs in an initial stage. The $2^{nd}$ generation (2G) mobile communication network global system of mobile communication/enhanced data rate for GSM evolution (GSM/EDGE) has been successful in commercial usage globally for many years. With large-scale deployment and commercial usage of the $3^{rd}$ generation (3G) mobile communication network universal mobile telecommunications system (UMTS) and hotspot deployment of the 4th generation (4G) mobile communication network long term evolution (LTE), operators, especially some new operators, gradually give up conventional strategies to deploy their own networks separately, and turn to build shared networks with other operators or to rent networks already deployed by other operators, in order to save the costs for network deployment and operations, to speed up the network deployment, and to expand the nextwork coverage.

Currently, there are mainly two ways for network sharing.

In the first way, at least two mobile operators share a radio access network (RAN) and mobility management network elements in core network, such as mobile switching center (MSC), serving GPRS support node (SGSN) and mobility management entity (MME), while other core network elements are not shared.

In the second way, at least two mobile operators share only the RAN, i.e., the mobility management network elements in core network are not shared.

Generally, a user equipment (UE) resides in its home public land mobile network (HPLMN) or equivalent HPLMN network (EHPLMN), and register itself at its HPLMN or EHPLMN to provide services to users. In some cases, for example, if a user roams to another country/region, or a place without signal coverage of a home operator, then the UE needs to select a visited public land mobile network (VPLMN), and at this time the UE is in a roaming state.

There are two network selection modes as follows for an idle mode UE to select a network in a shared cell.

In an automatic network selection mode, a UE is preconfigured with a PLMN list, where the PLMNs in the list are sorted by priority, and the UE automatically selects an available network with highest priority according to the PLMN list when network selection is desired, where the automatic network selection needs no participation of a user and the user has no perception of the selection.

In a manual network selection mode, a UE displays all currently available networks to a user, and the user manually selects a desired network.

For a UE residing in its HPLMN or EHPLMN, the HPLMN/EHPLMN of the UE has highest priority. Whereas for a UE residing in a VPLMN and adopting the automatic network selection mode, the current registered public land mobile network (RPLMN) of the UE does not necessarily have the highest priority. In order to avoid communication interruption or delay caused by the frequent network reselection of the UE in roaming state, the UE still prefers to select the current RPLMN rather than performs network selection if the current RPLMN is available in a current cell.

However, if a UE resides in a VPLMN and the UE is already within coverage of the UE's home HPLMN or EHPLMN, then the UE still resides in the VPLMN and is in a roaming state because the current RPLMN is still available in the current cell. Thus, user's requirements for a stable and reliable local service (non-roaming service) with higher quality at low charges can not be met, and the user's experience is poor. Similarly, if a UE resides in a VPLMN and the UE is already within coverage of a PLMN with higher priority, then the UE still resides in the VPLMN with lower priority because the current RPLMN is still available in the current cell. Thus, user's requirements for stable and reliable service with higher quality can not be met, which results in poor user experience as well.

SUMMARY

A method and device for selecting a network from shared networks are provided according to embodiments of the invention, for implementing network selection by a UE when the UE enters a shared cell.

In a first aspect, an embodiment of the invention provides a method for selecting a network from shared networks, including: receiving network selection indication information by a user equipment UE, where the network selection indication information is for indicating the UE to select in a shared cell an equivalent home network of the UE, a home network of the UE, or a network with higher priority than that of a current registered network of the UE; and selecting a target network in the shared cell by the UE using the network selection indication information, where the target network is the equivalent home network of the UE, the home network of the UE, or the network with higher priority than that of the current registered network of the UE.

In a first possible implementation for the first aspect, the receiving network selection indication information by the user equipment UE, includes:

receiving in the shared cell, by the UE, the network selection indication information.

In a second possible implementation for the first aspect, the receiving network selection indication information by a user equipment UE, includes:

receiving in a source cell, by the UE, the network selection indication information, where the source cell is a cell on which the UE camped before the UE entering the shared cell.

In conjunction with any one of the first aspect to the second possible implementation for the first aspect, in a third possible implementation, the network selection indication information is a time value, and the selecting a target network in a shared cell by the UE using the network selection indication information, includes:

selecting the target network in the shared cell by the UE when a period indicated by the time value elapsed.

In a third possible implementation for the first aspect, the receiving network selection indication information by a user equipment UE, includes:

receiving, by the UE, the network selection indication information sent by a mobility management network element.

In conjunction with the third possible implementation for the first aspect, in a fourth possible implementation, before the receiving, by the UE, the network selection indication information sent by a mobility management network element, the method includes:

sending, by the UE to the mobility management network element, available networks information of the UE in the shared cell, to enable the mobility management network element to determine the network selection indication information using the available networks information;

where the available networks information includes: an identity of the home network of the UE, or an identity of the equivalent home network of the UE, the home network of the UE, or an identity of a network with higher priority than that of the current registered network of the UE, or an indication that the home network of the UE is available, or an indication that the equivalent home network of the UE is available, or an indication that a network with higher priority than that of the current registered network of the UE is available.

In conjunction with any one of the first aspect to the fourth possible implementation for the first aspect, the selecting a target network in a shared cell by the UE using the network selection indication information, includes:

the selecting a target network in a shared cell by the UE using the network selection indication information, includes:

selecting, by the UE using the network selection indication information, a network with highest priority from at least one equivalent home network of the UE, in a case that at least one equivalent home network of the UE is available; or, selecting, by the UE using the network selection indication information, the home network of the UE, in a case that none of the equivalent home networks of the UE is available and the home network of the UE is available; or, selecting, by the UE using the network selection indication information, a network with highest priority from at least one network with higher priority than that of the current registered network of the UE, in a case that none of the equivalent home networks of the UE and the home network of the UE is available but at least one network with higher priority than that of the current registered network of the UE is available.

In a second aspect, a method for selecting a network from shared networks is provided, including:

selecting in a shared cell, a target network by a user equipment UE when uplink information is required to be sent, where the target network includes the equivalent home network of the UE, the home network of the UE, or a network with higher priority than that of the current registered network of the UE; and sending the uplink information to the target network by the UE.

In a first possible implementation for the second aspect, the selecting, in a shared cell, a target network by a UE, includes:

selecting, by the UE, a network with highest priority from at least one equivalent home network of the UE, in a case that at least one equivalent home network of the UE is available; or, selecting, by the UE, the home network of the UE, in a case that none of the equivalent home networks of the UE is available and the home network of the UE is available; or, selecting, by the UE, a network with highest priority from at least one network with higher priority than that of the current registered network of the UE, in a case that none of the equivalent home networks of the UE and the home network of the UE is available but at least one network with higher priority than that of the current registered network of the UE is available.

In a third aspect, a method for selecting a network from shared networks is provided, including:

broadcasting in a cell, by a base station, network selection indication information, where the network selection indication information is for indicating a user equipment UE to select a target network in a shard cell, where the target network includes an equivalent home network of the UE, a home network of the UE, or a network with higher priority than that of a current registered network of the UE.

In a first possible implementation for the third aspect, the cell is the shared cell.

In conjunction with the first possible implementation for the third aspect, in a second possible implementation, the method further includes:

sending to the target network, by the base station, a message received from the UE.

In a second possible implementation for the third aspect, the cell is a cell on which the UE camped before the UE entering the shared cell.

In conjunction with any one of the third aspect to the second possible implementation for the third aspect, the network selection indication information includes a time value, for indicating the UE to select the target network in the shared cell when a period indicated by the time value elapsed.

In a fourth aspect, a UE is provided, including:

a receiving unit, configured to receive network selection indication information, where the network selection indication information is for indicating the UE to select in a shared cell the equivalent home network of the UE, the home network of the UE, or a network with higher priority than that of the current registered network of the UE; and a processing unit, configured to select a target network in the shared cell using the network selection indication information, where the target network is the equivalent home network of the UE, the home network of the UE, or a network with higher priority than that of the current registered network of the UE.

In a first possible implementation for the fourth aspect, the receiving unit is configured to receive, in the shared cell, the network selection indication information.

In a second possible implementation for the fourth aspect, the receiving unit is configured to receive, in a source cell, the network selection indication information, where the source cell is a cell on which the UE camped before the UE entering the shared cell.

In conjunction with any one of the fourth aspect to the second possible implementation for the fourth aspect, in a third possible implementation, the network selection indication information is a time value; and the processing unit is configured to select the target network in the shared cell when a period indicated by the time value elapsed.

In a third possible implementation for the fourth aspect, the receiving unit is configured to receive the network selection indication information sent by a mobility management network element.

In conjunction with the third possible implementation for the fourth aspect, in a fourth possible implementation, the UE further includes: a sending unit, configured to send, to the mobility management network element, available networks information of the UE in the shared cell, before the receiving unit receives the network selection indication information sent by the mobility management network element, so that the mobility management network element determines the network selection indication information using the available networks information;

where the available networks information includes: an identity of the home network of the UE, or an identity of the equivalent home network of the UE, the home network of the UE, or an identity of a network with higher priority than that of the current registered network of the UE, or an indication that the home network of the UE is available, or an indication that the equivalent home network of the UE is available, or an indication that a network with higher priority than that of the current registered network of the UE is available.

In conjunction with any one of the fourth aspect to the third possible implementation for the fourth aspect, the processing unit is configured to select, using the network selection indication information, a network with highest priority from at least one equivalent home network of the UE, in a case that at least one equivalent home network of the UE is available; or, configured to select the home network of the UE using the network selection indication information, in a case that none of the equivalent home networks of the UE is available and the home network of the UE is available; or, configured to select, using the network selection indication information, a network with highest priority from at least one network with higher priority than that of the current registered network of the UE, in a case that none of the equivalent home networks of the UE and the home network of the UE is available but at least one network with higher priority than that of the current registered network of the UE is available.

In a fifth aspect, a UE is provided, including: a processing unit, configured to select a target network in a shared cell when uplink information is required to be sent, where the target network includes the equivalent home network of the UE, the home network of the UE, or a network with higher priority than that of the current registered network of the UE; and a sending unit, configured to send the uplink information to the target network.

In a first possible implementation for the fifth aspect, the processing unit is configured to select a network with highest priority from at least one equivalent home network of the UE, in a case that at least one equivalent home network of the UE is available; or, configured to select the home network of the UE, in a case that none of the equivalent home networks of the UE is available and the home network of the UE is available; or, configured to select a network with highest priority from at least one network with higher priority than that of the current registered network of the UE, in a case that none of the equivalent home networks of the UE and the home network of the UE is available but at least one network with higher priority than that of the current registered network of the UE is available.

In a sixth aspect, a base station is provided, including: a sending unit, configured to broadcast, in a cell, network selection indication information, where the network selection indication information is for indicating a user equipment UE to select a target network in a shard cell, where the target network includes an equivalent home network of the UE, a home network of the UE, or a network with higher priority than that of a current registered network of the UE.

In a first possible implementation for the sixth aspect, the cell is the shared cell.

In conjunction with the first possible implementation for the sixth aspect, in a second possible implementation, the base station further includes:

a receiving unit, configured to receive a message sent from the UE; and the sending unit is further configured to send to the target network the message received by the receiving unit.

In a second possible implementation for the sixth aspect, the cell is a cell on which the UE camped before the UE entering the shared cell.

In conjunction with any one of the sixth aspect to the second possible implementation for the sixth aspect, the network selection indication information includes a time value, for indicating the UE to select the target network in the shared cell when a period indicated by the time value elapsed.

In a seventh aspect, a mobility management network element is provided, including: a sending unit, configured to send network selection indication information to a UE, where the network selection indication information is for indicating the UE to select a target network in a shared cell, where the target network includes an equivalent home network of the UE, a home network of the UE, or a network with higher priority than that of a current registered network of the UE.

In a first possible implementation for the seventh aspect, the mobility management network element further includes:

a receiving unit, configured to receive from the UE, available networks information of the UE in the shared cell, before the sending unit sends network selection indication information to the UE; and a processing unit, configured to determine the network selection indication information using the available networks information received by the receiving unit;

where the available networks information includes: an identity of the home network of the UE, or an identity of the equivalent home network of the UE, the home network of the UE, or an identity of a network with higher priority than that of the current registered network of the UE, or an indication that the home network of the UE is available, or an indication that the equivalent home network of the UE is available, or an indication that a network with higher priority than that of the current registered network of the UE is available.

According to the foregoing solutions, a UE selects a target network in a shared cell using received network selection indication information when the UE enters the shared cell and performs network selection in an automatic network selection mode, avoiding a case that the UE prefers a current registered network rather than performs network selection even if the UE is within coverage of the home network of the UE, the equivalent home network of the UE, or a network with higher priority than that of the current registered network of the UE. Thus, it is ensured that the UE selects its home network or equivalent home network, to end a roaming state and obtain a stable and reliable local service with higher quality at lower charges; or it is ensured that the UE selects a network with higher priority, to obtain a stable and reliable service with higher quality, thus improving user experience.

BRIEF DESCRIPTION OF THE DRAWINGS

For clarity of description of technical solutions in embodiments of the invention or in prior art, drawings for description of the embodiments or of prior art are described below briefly. Apparently, the drawings described below are merely a few embodiments of the invention. For those skilled in the art, according to these drawings, other drawings may be obtained without paying any creative work.

DETAILED DESCRIPTION OF THE EMBODIMENTS

Next, technical solutions in embodiments of the invention are clearly and completely described in conjunction with drawings in the embodiments of the invention. Apparently, the described embodiments are merely a few, rather than all embodiments of the invention. Based on the embodiments in the disclosure, any other embodiment obtained by those skilled in the art without creative work falls within the scope of the invention.

In the embodiments of the invention, a user equipment (abbreviated as UE) may be any one of the following, and the UE may be static or mobile. A static UE may include a terminal, a mobile station, a subscriber unit, or a station, etc. A mobile UE may include a cellular phone, a personal digital assistant (PDA), a modem, a wireless communication device, a handheld, a laptop computer, a cordless phone, or a wireless local loop (WLL), etc. The UE may be distributed in a whole wireless network.

In the embodiments of the invention, a base station may be a base station subsystem (BSS) in a 2G network, a radio network subsystem (RNS) in a 3G network, or an evolved node B (eNodeB) in an LTE network. A mobility management network element may be any one of a mobile switching center (MSC)/visitors location register (VLR), a mobility management entity (MME), a serving GPRS support node (SGSN), where an MSC and a VLR are usually combined as one network element called MSC/VLR, or referred to as VLR.

Figure 1:
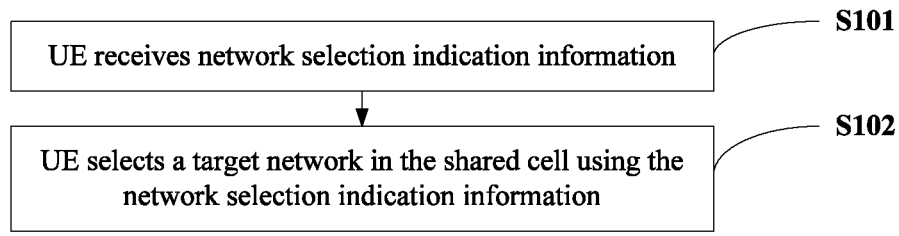
FIG. 1 is a diagram of a method for selecting a network from shared networks provided in an embodiment of the invention.

A method for selecting a network from shared networks is provided in this embodiment of the invention, as shown in FIG. 1. The method is executed by a UE. The method includes S101 and S102.

In S101, a UE receives network selection indication information.

The network selection indication information is used for indicating the UE to select in a shared cell an equivalent home network of the UE, a home network of the UE, or a network with higher priority than that of a current registered network of the UE.

In particular, the network selection indication information may carry an identifier for indicating the UE whether executing a network selection policy is permitted. For example, the UE is indicated to select a target cell in the shared cell if an identifier carried by the network selection indication information is 1; on the contrary, the UE does not select a target cell if an identifier carried by the network selection indication information is 0.

In addition, the UE further receives, in the shared cell, an identity of the home network of the UE broadcasted in the cell, identities of the equivalent home networks of the UE, or identities of networks with higher priority than the current registered network of the UE, so that the UE gets knowledge of available networks for selection.

In S102, the UE selects, in the shared cell, a target network using the network selection indication information.

The target network is the equivalent home network of the UE, the home network of the UE, or a network with higher priority than that of the current registered network of the UE.

Furthermore, the network selection indication information may be a time value. The UE receives the time value broadcasted in the cell by a base station, and selects a target network when a period indicated by the time value elapsed.

Optionally, the UE sets a preconfigured time according to the time value, and selects a target network at the preconfigured time or later than the preconfigured time. For example, the time value carried by the network selection indication information is 5 minutes. If the time value is received at time A, then the UE selects a target network at time B or after the time B, where the time B is 5 minutes later than the time A.

Optionally, the UE starts a timer according to the time value, and selects a target network when the timer expires. For example, the time value carried by the network selection indication information is 5 minutes, then a timer is started when the time value is received, and to select the target network when the timer runs to 5 minutes.

It should be noted that, if the time value is too large, then the UE can not select a target network soon, which affects user experience. Therefore, preferably, the time value may be set to be within 6 minutes.

In addition, the time value may be stored in a subscriber identity module (SIM) or universal subscriber identity module (USIM) card, or stored in the UE's own storage device.

Furthermore, the timer in the UE stops timing after the network is selected by the UE.

In the step S101, the UE may receive the network selection indication information in the following three ways.

In a first way, the UE receives the network selection indication information in the shared cell.

In particular, the UE enters the shared cell from a cell on which the UE currently camps, and receives, in the shared cell, network selection indication information broadcasted by a shared base station, and the UE selects a target network in the shared cell, where the shared base station is a base station serving the shared cell.

It should be noted that, the shared base station may broadcast, within the shard cell, network selection indication information for each shared networks respectively, or may broadcast, within the shard cell, the same network selection indication information for all shared networks, which is not limited in the disclosure.

Furthermore, the shared base station further broadcasts an identity of the home network of the UE, an identity of the equivalent home network of the UE, or an identity of a network with higher priority than the current registered network of the UE, so that the UE gets knowledge of available networks for selection.

In a second way, the UE receives the network selection indication information in a source cell.

Furthermore, the UE stores the network selection indication information.

The source cell may be a shared cell or a non-shared cell, which is not limited here, and the source cell is a cell on which the UE currently camps, i.e., a cell on which the UE camped before the UE entering a target shared cell.

In particular, the UE receives the network selection indication information in the source cell and stores the network selection indication information, and the UE selects a target network using the stored network selection indication information when the UE enters the shared cell from the cell on which the UE currently camps.

It should be noted that, if the source cell is a shared cell, then a source base station may broadcast, within the shard cell, network selection indication information for each shared networks respectively, or may broadcast, within the shard cell, the same network selection indication information for all shared networks, which is not limited in the disclosure.

Furthermore, the source base station further broadcasts an identity of the home network of the UE, an identity of the equivalent home network of the UE, or an identity of a network with higher priority than the current registered network of the UE, so that the UE gets knowledge of available networks for selection.

It should be noted that, in the second way, the UE receives, in the shared cell, no network selection indication information broadcasted by the shared base station, therefore, the UE selects a target network using stored network selection indication information.

Especially, if the UE receives, in a source cell, network selection indication information, and also receives, in the shared cell, the network selection indication information, then the UE selects a target network using the network selection indication information received in the shared cell.

In particular, when the UE, which stores, in a source cell, received network selection indication information, enters a shared cell form the cell on which the UE currently camps, and receives, in the shared cell, network selection indication information broadcasted by a shared base station, the UE selects a target network using the network selection indication information received in the shared cell, where the source cell may be a shared cell, or a non-shared cell, which is not limited here, and the source cell is a cell on which the UE currently camps, i.e., a cell on which the UE camped before the UE entering a target shared cell.

In a third way, the UE enters a shared cell and UE's location area is changed, and the UE receives network selection indication information sent by a mobility management network element.

Furthermore, before the UE receives the network selection indication information sent by a mobility management network element, the UE sends available networks information of the UE in the shared area where the UE is located, to the mobility management network element, so that the mobility management network element can determine the network selection indication information according to the available networks information of the UE.

The available networks information includes: an identity of the home network of the UE, or an identity of the equivalent home network of the UE, the home network of the UE, or an identity of a network with higher priority than that of the current registered network of the UE, or an indication that the home network of the UE is available, or an indication that the equivalent home network of the UE is available, or an indication that a network with higher priority than that of the current registered network of the UE is available.

In particular, after receiving the available networks information, the mobility management network element determines, according to configuration of the mobility management network element or according to agreement reached by operators when establishing the shared cell, whether to permit the UE to select a target network, and the mobility management network element sends network selection indication information to the UE to indicate the UE to select the target network.

It should be noted that, a shared network deployed by the operators may cover multiple location areas, where cells in a location area are all non-shared cells or are all shared cells. Therefore, if a UE enters a shared cell from a non-shared cell, it can be deemed that the location area is changed. However, if a UE enters a shared cell from another shared cell, it is not certain that the location area is changed; while the UE triggers a location update procedure when the location area is changed. The third way above is mainly for the cases in which the location area is changed.

There may be three cases for selecting a target network in the shared cell by the UE using the network selection indication information in the above step S102:

a first case, including: selecting, by the UE using the network selection indication information, an equivalent home network with highest priority from at least one equivalent home network of the UE, in a case that at least one equivalent home network of the UE is available; or, a second case, including: selecting, by the UE using the network selection indication information, the home network of the UE, in a case that none of the equivalent home networks of the UE is available and the home network of the UE is available; or, a third case, including: selecting, by the UE using the network selection indication information, a network with highest priority from at least one network with higher priority than that of the current registered network of the UE, in a case that none of the equivalent home networks of the UE and the home network of the UE is available but at least one network with higher priority than that of the current registered network of the UE is available.

It should be noted that, in the third case above, if the current registered network of the UE or a network equivalent to the current registered network of the UE has highest priority, then the current registered network of the UE or the network equivalent to the current registered network of the UE is selected (i.e., the current registered network is kept unchanged).

A network is determined to be available if following two conditions are both met:

a first condition: finding out at least one cell in the network by the UE; and a second condition: reading an identity of the network by the UE.

It should be noted that, in the embodiment, the source base station may be a non-shared base station, or a shared base station.

In addition, to prevent a "ping-pong" effect in a border area between a shared cell and a non-shared cell (frequent network change resulted from a UE's back and forth movement in a border area), broadcasting the foregoing network selection indication information by a base station at the border area should be avoided.

With the method executed by a UE according to the above embodiment, the UE selects a target network in a shared cell using received network selection indication information when the UE enters the shared cell and performs network selection by using an automatic network selection mode, avoiding a case that the UE prefers a current registered network rather than performs network selection even if the UE is within coverage of the home network of the UE, the equivalent home network of the UE, or a network with higher priority than that of the current registered network of the UE, ensuring that the UE selects its home network or equivalent home network, to end a roaming state and obtain a stable and reliable local service with higher quality at lower charges; or ensuring that the UE selects a network with higher priority, to obtain a stable and reliable service with higher quality, thus improving user experience.

Figure 2:
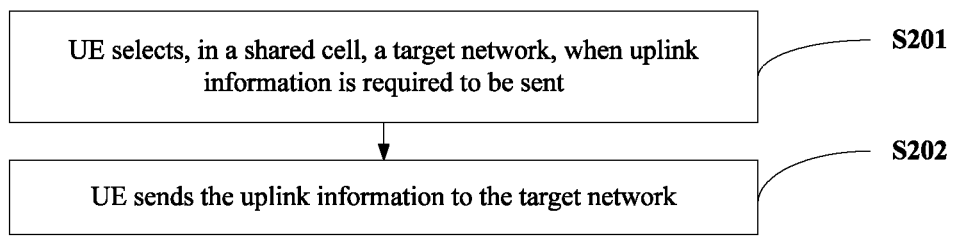
FIG. 2 is a diagram of a method for selecting a network from shared networks provided in another embodiment of the invention.
Figure 3:
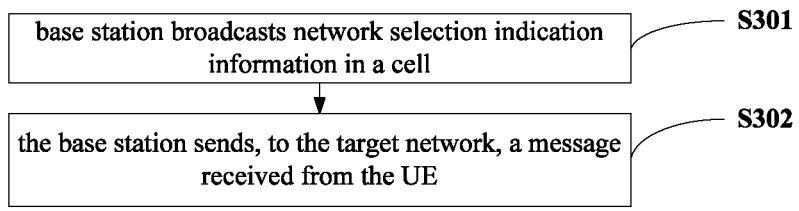
FIG. 3 is a diagram of a method for selecting a network from shared networks provided in another embodiment of the invention.

A method for selecting a network from shared networks is provided in this embodiment of the invention, as shown in FIG. 2, where the method is executed by a UE, and the method includes:

In S201, a UE selects, in a shared cell, a target network, when uplink information is required to be sent.

The target network includes the equivalent home network of the UE, the home network of the UE, or a network with higher priority than that of the current registered network of the UE.

In particular, the UE receives an identity of the home network of the UE, an identity of the equivalent home network of the UE, or an identity of a network with higher priority than the current registered network of the UE, which is broadcasted by a base station to the UE, so that the UE gets knowledge of available networks for selection.

In addition, there may be three cases for the selecting a target network in the shared cell by the UE:

a first case, including: selecting, by the UE, a network with highest priority from at least one equivalent home network of the UE, in a case that at least one equivalent home network of the UE is available; or, a second case, including: selecting, by the UE, the home network of the UE, in a case that none of the equivalent home networks of the UE is available and the home network of the UE is available; or, a third case, including: selecting, by the UE, a network with highest priority from at least one network with higher priority than that of the current registered network of the UE, in a case that none of the equivalent home network of the UE and the home network of the UE is available but at least one network with higher priority than that of the current registered network of the UE is available.

It should be noted that, in the third case above, if the current registered network of the UE or a network equivalent to the current registered network of the UE has highest priority, then the current registered network of the UE or the network equivalent to the current registered network of the UE is selected (i.e., the current registered network is kept unchanged).

A network is determined to be available if following two conditions are both met:

a first condition: finding out at least one cell in the network by the UE; and a second condition: reading an identity of the network by the UE.

It should be noted that, to prevent a "ping-pong" effect in a border area between a shared cell and a non-shared cell (frequent network change resulted from a UE's back and forth movement in a border area), the case of selecting a target network by the UE in the border area when the UE sends uplink information should be avoided.

In S202, the UE sends the uplink information to the target network.

In particular, after the UE selects a network, the UE initiates a registration procedure to the selected network, and sends the uplink information.

According to the method provided in the above embodiment, when a UE enters a shared cell and performs network selection by using an automatic network selection mode, the UE selects a target network in the shared cell when the UE needs to send uplink information. The signaling load during network selection is reduced. Thus the UE is ensured to select its home network or equivalent home network, to end a roaming state and obtain a stable and reliable local service with higher quality at lower charges, or, the UE is ensured to select a network with higher priority, to obtain a stable and reliable service with higher quality, thus improving user experience.

A method for selecting a network from shared networks is provided in this embodiment of the invention, where the embodiment is executed by a base station, and the method includes:

In S301, a base station broadcasts network selection indication information in a cell.

The network selection indication information is used for indicating a user equipment UE to select a target network in a shard cell, where the target network includes the equivalent home network of the UE, the home network of the UE, or a network with higher priority than that of the current registered network of the UE.

In particular, the network selection indication information may carry an identifier for indicating the UE whether executing a network selection policy is permitted. For example, if an identifier carried by the network selection indication information is 1, then the UE is indicated to select a target cell in the shared cell; on the contrary, if an identifier carried by the network selection indication information is 0, then the UE does not select a target cell.

Furthermore, the network selection indication information may be a time value. The UE receives the time value broadcasted in the cell by a base station, and selects a target network when a period indicated by the time value elapsed.

Optionally, the UE sets a preconfigured time according to the time value, and selects a target network at the preconfigured time or later than the preconfigured time. For example, the time value carried by the network selection indication information is 5 minutes. If the time value is received at time A, then the UE selects a target network at time B or after the time B, where the time B is 5 minutes later than the time A.

Optionally, the UE starts a timer according to the time value, and selects a target network when the timer expires. For example, the time value carried by the network selection indication information is 5 minutes, then a timer is started when the time value is received, and to select the target network when the timer runs to 5 minutes.

It should be noted that, if the time value is too large, then the UE can not select a target network soon, which affects user experience. Therefore, preferably, the time value may be set to be within 6 minutes.

In addition, the time value may be stored in a SIM or USIM card, or stored in the UE's own storage device.

Furthermore, the timer in the UE stops timing after the network is selected by the UE.

Optionally, the cell is a shared cell.

In this case, the base station is a shared base station, and the shared base station is a base station serving the shared cell.

In particular, the UE enters the shared cell from a source cell, and receives network selection indication information broadcasted in the shared cell by the base station, and then the UE selects a target network using the network selection indication information.

It should be noted that, the shared base station may broadcast, within the shard cell, network selection indication information for each shared network respectively, or may broadcast, within the shard cell, the same network selection indication information for all shared networks, which is not limited in the disclosure.

Optionally, the cell is a cell on which the UE camped before the UE entering the shared cell, i.e., is a source cell.

In this case, the base station may be a source base station, and the source cell may be a shared cell, or a non-shared cell, which is not limited here.

In particular, the UE receives, in the source cell, network selection indication information broadcasted in the source cell by a base station, and stores the network selection indication information, and the UE selects a target network using the network selection indication information when the UE enters the shared cell from the source cell.

It should be noted that, if the source cell is a shared cell, then the base station may broadcast, within the shard cell, network selection indication information for each shared network respectively, or may broadcast, within the shard cell, the same network selection indication information for all shared networks, which is not limited in the disclosure.

In addition, to prevent a "ping-pong" effect in a border area between a shared cell and a non-shared cell (frequent network change resulted from a UE's back and forth movement in a border area), broadcasting the foregoing network selection indication information by a base station at the border area should be avoided.

Furthermore, when broadcasting network selection indication information, the base station further broadcasts an identity of the current registered network of the UE, an identity of the home network of the UE, identities of the equivalent home networks of the UE, or identities of networks with higher priority than the current registered network of the UE, so that the UE gets knowledge of available network for selection.

There may be three cases for the selecting a target network by the UE using the network selection indication information:

a first case, including: selecting, by the UE using the network selection indication information, a network with highest priority from at least one equivalent home network of the UE, in a case that at least one equivalent home network of the UE is available; or, a second case, including: selecting, by the UE using the network selection indication information, the home network of the UE, in a case that none of the equivalent home networks of the UE is available and the home network of the UE is available; or, a third case, including: selecting, by the UE using the network selection indication information, a network with highest priority from at least one network with higher priority than that of the current registered network of the UE, in a case that none of the equivalent home networks of the UE and the home network of the UE is available but at least one network with higher priority than that of the current registered network of the UE is available.

It should be noted that, in the third case above, if the current registered network of the UE or a network equivalent to the current registered network of the UE has highest priority, then the current registered network of the UE or the network equivalent to the current registered network of the UE is selected (i.e., the current registered network is kept unchanged).

A network is determined to be available if following two conditions are both met:

a first condition: finding out at least one cell in the network by the UE; and a second condition: reading an identity of the network by the UE.

It should be noted that, in the embodiment, the source base station may be a non-shared base station, or a shared base station.

In addition, to prevent a "ping-pong" effect in a border area between a shared cell and a non-shared cell (frequent network change resulted from a UE's back and forth movement in a border area), broadcasting the foregoing network selection indication information by a base station at the border area should be avoided.

Furthermore, the embodiment further includes the following step:

In S302, the base station sends, to the target network, a message received from the UE.

In particular, after selecting the target network, the UE initiates a procedure of registering to the selected target network, and during the registration procedure, a message received from the UE is sent by the base station to the selected target network, and after the UE finishes the procedure of registering to the selected target network, subsequent messages received from the UE are also sent by the base station to the target network.

With the method executed by a base station according to the above embodiment, a UE selects a target network in a shared cell using received network selection indication information when the UE enters the shared cell and performs network selection by using an automatic network selection mode, avoiding a case that the UE prefers a current registered network rather than performs network selection even if the UE is within coverage of the home network of the UE, the equivalent home network of the UE, or a network with higher priority than that of the current registered network of the UE, ensuring that the UE selects its home network or equivalent home network, to end a roaming state and obtain a stable and reliable local service with higher quality at lower charges; or ensuring that the UE selects a network with higher priority, to obtain a stable and reliable service with higher quality, thus improving user experience.

Figure 4:
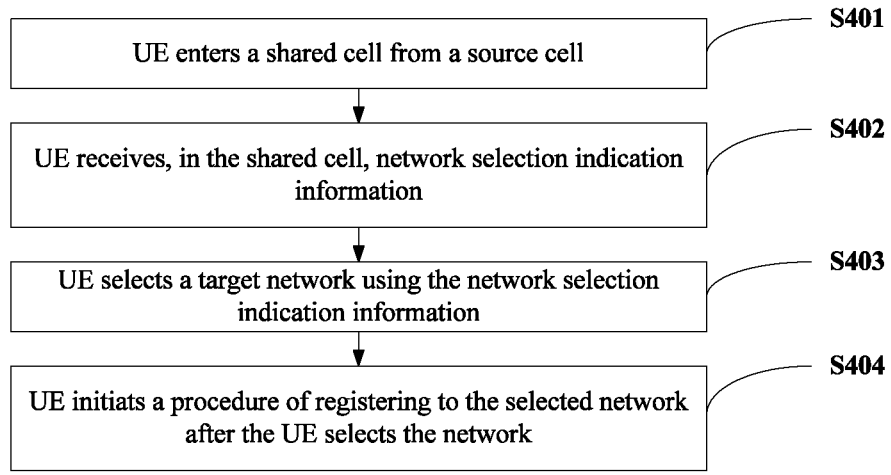
FIG. 4 is a diagram of a method for selecting a network from shared networks provided in another embodiment of the invention.

A method for selecting a network from shared networks is provided in this embodiment of the invention, as shown in FIG. 4. The embodiment is applied to a context where a UE enters a shared cell and performs network selection by using an automatic network selection mode. The method includes S401 to S404.

In S401, a UE enters a shared cell from a source cell.

The UE enters the shared cell through cell selection or cell reselection; the source cell is a cell were the UE currently resides, i.e., is a cell on which the UE camped before the UE enters a target shared cell; and the source cell may be a shared cell, or a non-shared cell.

In S402, the UE receives, in the shared cell, network selection indication information.

The network selection indication information is for indicating the UE to select in a shared cell the equivalent home network of the UE, the home network of the UE, or a network with higher priority than that of the current registered network of the UE.

Furthermore, an identity of the home network of the UE broadcasted in the cell, an identity of the equivalent home network of the UE, or an identity of a network with higher priority than the current registered network of the UE is also broadcasted in the shared cell, so that the UE gets knowledge of network available for selection.

It should be noted that, a shared base station may broadcast, within the shard cell, network selection indication information corresponding to each shared network, or may broadcast, within the shard cell, same network selection indication information for all shared networks, which is not limited in the disclosure.

In S403, the UE selects a target network using the network selection indication information.

In particular, the network selection indication information may carry an identifier for indicating the UE whether executing a network selection policy is permitted. For example, if an identifier carried by the network selection indication information is 1, then the UE is indicated to select a target cell in the shared cell; on the contrary, if an identifier carried by the network selection indication information is 0, then the UE does not select a target cell.

Furthermore, the network selection indication information may be a time value. The UE receives the time value broadcasted in the cell by a base station, and selects a target network when a period indicated by the time value elapsed.

Optionally, the UE sets a preconfigured time according to the time value, and selects a target network at the preconfigured time or later than the preconfigured time. For example, the time value carried by the network selection indication information is 5 minutes. If the time value is received at a time A, then the UE selects a target network at time B or after the time B, where the time B is 5 minutes later than the time A.

Optionally, the UE starts a timer according to the time value, and selects a target network when the timer expires. For example, the time value carried by the network selection indication information is 5 minutes, then a timer is started when the time value is received, and the target network is selected when the timer runs to 5 minutes.

It should be noted that, if the time value is too large, then the UE can not select a target network soon, which affects user experience. Therefore, preferably, the time value may be set to be within 6 minutes.

In addition, the time value may be stored in a SIM or USIM card, or stored in the UE's own storage device.

Furthermore, the timer in the UE stops timing after the network is selected by the UE.

There may be three cases for selecting a target network in the shared cell by the UE using the network selection indication information:

a first case, including: selecting, by the UE using the network selection indication information, a network with highest priority from at least one equivalent home network of the UE, in a case that at least one equivalent home network of the UE is available; or, a second case, including: selecting, by the UE using the network selection indication information, the home network of the UE, in a case that none of the equivalent home networks of the UE is available and the home network of the UE is available; or, a third case, including: selecting, by the UE using the network selection indication information, a network with highest priority from at least one network with higher priority than that of the current registered network of the UE, in a case that none of the equivalent home networks of the UE and the home network of the UE is available but at least one network with higher priority than that of the current registered network of the UE is available.

It should be noted that, in the third case above, if the current registered network of the UE or a network equivalent to the current registered network of the UE has highest priority, then the current registered network of the UE or the network equivalent to the current registered network of the UE is selected (i.e., the current registered network is kept unchanged).

A network is determined to be available if following two conditions are both met:

a first condition: finding out at least one cell in the network by the UE; and a second condition: reading an identity of the network by the UE.

In addition, to prevent a "ping-pong" effect in a border area between a shared cell and a non-shared cell (frequent reselection between networks resulted from a UE's reciprocating movement in a border area), broadcasting the forgoing network selection indication information by a base station at the border area should be avoided.

In S404, the UE initiates a registration procedure to the selected network after the UE selects the network.

It should be noted that, the step is omitted if the selected target network is the current registered network of the UE.

Especially, during the registering process, a message received from the UE is sent by the base station to the selected target network, and after the UE finishes the procedure of registering to the selected target network, subsequent messages received from the UE are also sent by the base station to the target network.

In addition, to prevent a "ping-pong" effect in a border area between a shared cell and a non-shared cell (frequent reselection between networks resulted from a UE's reciprocating movement in a border area), broadcasting the forgoing network selection indication information by a base station at the border area should be avoided.

It should be noted that, for simplicity of the description, the above method embodiment is described as a combination of a series of actions. However, those skilled in the art should know that, the disclosure is not limited to the order of the described actions. Secondly, those skilled in the art should also know that, the embodiments described in the description are all preferred embodiments, and the actions and modules involved are not necessarily required by the invention.

Thus, when the UE enters the shared cell and performs network selection by using an automatic network selection mode, it is ensured that the UE selects its home network or equivalent home network, to end a roaming state and obtain a stable and reliable local service with higher quality at lower charges; or ensuring that the UE selects a network with higher priority, to obtain a stable and reliable service with higher quality, thus improving user experience.

Figure 5:
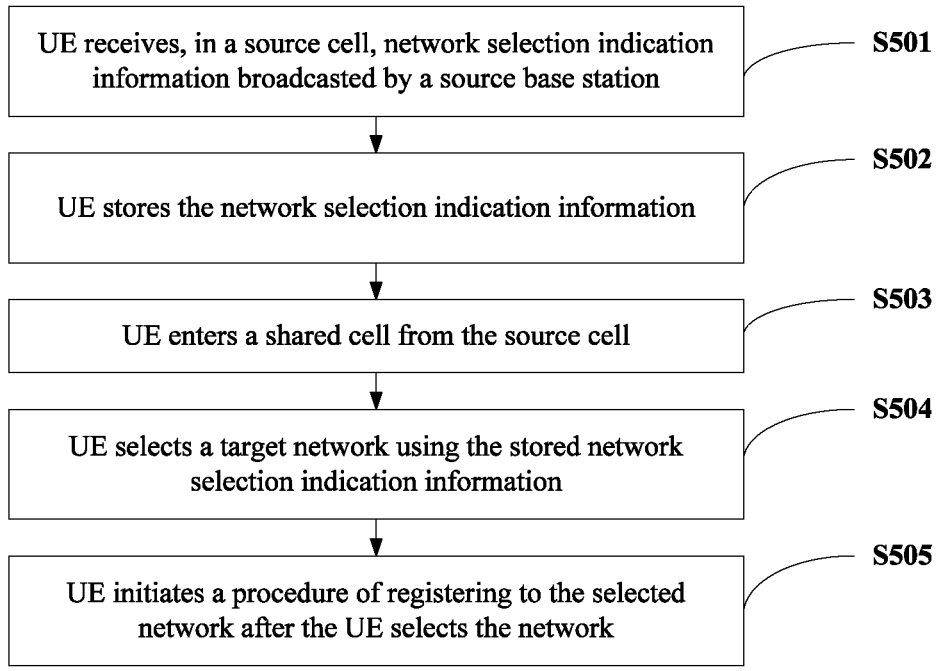
FIG. 5 is a diagram of a method for selecting a network from shared networks provided in another embodiment of the invention.

A method for selecting a network from shared networks is provided in this embodiment of the invention, as shown in FIG. 5. The embodiment is applied to a context where a UE enters a shared cell and performs network selection by using an automatic network selection mode. The method includes S501 to S505.

In S501, a UE receives, in a source cell, network selection indication information broadcasted by a source base station.

The network selection indication information is for indicating the UE to select in a shared cell the equivalent home network of the UE, the home network of the UE, or a network with higher priority than that of the current registered network of the UE. The source cell is a cell were the UE currently resides, i.e., is a cell on which the UE camped before the UE enters a target shared cell. The source cell may be a shared cell, or a non-shared cell.

It should be noted that, if the source cell is a shared cell, then a source base station may broadcast, within the shard cell, network selection indication information corresponding to each shared network, or may broadcast, within the shard cell, same network selection indication information for all shared networks, which is not limited in the disclosure.

In S502, the UE stores the network selection indication information.

In S503, the UE enters a shared cell from the source cell.

The UE enters the shared cell through cell selection or cell reselection. It should be noted that, in the embodiment, no network selection indication information is broadcasted in the shared cell.

In S504, the UE selects a target network using the stored network selection indication information.

In particular, the network selection indication information may carry an identifier for indicating the UE whether executing a network selection policy is permitted. For example, if an identifier carried by the network selection indication information is 1, then the UE is indicated to select a target cell in the shared cell; on the contrary, if an identifier carried by the network selection indication information is 0, then the UE does not select a target cell.

Furthermore, the network selection indication information may be a time value. The UE receives the time value broadcasted in the cell by a base station, and selects a target network when a period indicated by the time value elapsed.

Optionally, the UE sets a preconfigured time according to the time value, and selects a target network at the preconfigured time or later than the preconfigured time. For example, the time value carried by the network selection indication information is 5 minutes. If the time value is received at a time A, then the UE selects a target network at time B or after the time B, where the time B is 5 minutes later than the time A.

Optionally, the UE starts a timer according to the time value, and selects a target network when the timer expires.

For example, the time value carried by the network selection indication information is 5 minutes, then a timer is started when the time value is received, and the target network is selected when the timer runs to 5 minutes.

It should be noted that, if the time value is too large, then the UE can not select a target network soon, which affects user experience. Therefore, preferably, the time value may be set to be within 6 minutes.

In addition, the time value may be stored in a SIM or USIM card, or stored in the UE's own storage device.

Furthermore, the timer in the UE stops timing after the network is selected by the UE.

There may be three cases for the foregoing selecting a target network in the shared cell by the UE using the network selection indication information:

a first case, including: selecting, by the UE using the network selection indication information, a network with highest priority from at least one equivalent home network of the UE, in a case that at least one equivalent home network of the UE is available; or, a second case, including: selecting, by the UE using the network selection indication information, the home network of the UE, in a case that none of the equivalent home networks of the UE is available and the home network of the UE is available; or, a third case, including: selecting, by the UE using the network selection indication information, a network with highest priority from at least one network with higher priority than that of the current registered network of the UE, in a case that none of the equivalent home networks of the UE and the home network of the UE is available but at least one network with higher priority than that of the current registered network of the UE is available.

It should be noted that, in the third case above, if the current registered network of the UE or a network equivalent to the current registered network of the UE has highest priority, then the current registered network of the UE or the network equivalent to the current registered network of the UE is selected (i.e., the current registered network is kept unchanged).

A network is determined to be available if following two conditions are both met:

a first condition: finding out at least one cell in the network by the UE; and a second condition: reading an identity of the network by the UE.

In S505, the UE initiates a registration procedure to the selected network after the UE selects the network.

It should be noted that, the step is omitted if the selected target network is the current registered network of the UE.

Especially, during the registering process, a message received from the UE is sent by the base station to the selected target network, and after the UE finishes the procedure of registering to the selected target network, subsequent messages received from the UE are also sent by the base station to the target network.

In addition, to prevent a "ping-pong" effect in a border area between a shared cell and a non-shared cell (frequent reselection between networks resulted from a UE's reciprocating movement in a border area), broadcasting the forgoing network selection indication information by a base station at the border area should be avoided.

It should be noted that, for simplicity of the description, the above method embodiment is described as a combination of a series of actions. However, those skilled in the art should know that, the disclosure is not limited to the order of the described actions. Secondly, those skilled in the art should also know that, the embodiments described in the description are all preferred embodiments, and the actions and modules involved are not necessarily required by the invention.

Thus, when the UE enters the shared cell and performs network selection by using an automatic network selection mode, it is ensured that the UE selects its home network or equivalent home network, to end a roaming state and obtain a stable and reliable local service with higher quality at lower charges; or ensuring that the UE selects a network with higher priority, to obtain a stable and reliable service with higher quality, thus improving user experience.

Figure 6:
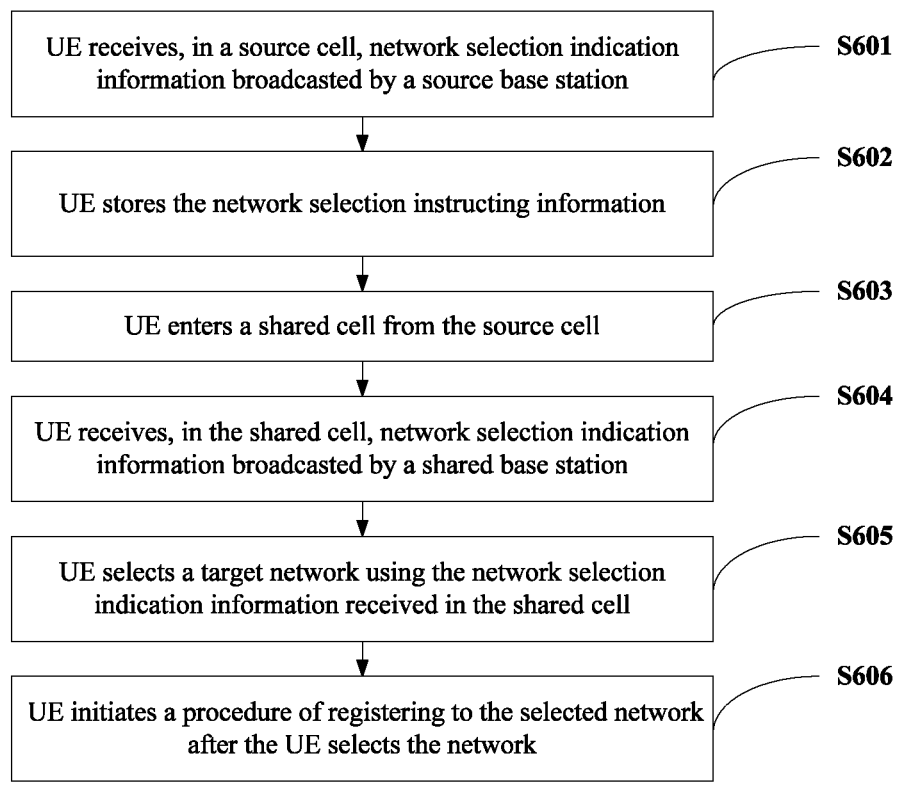
FIG. 6 is a diagram of a method for selecting a network from shared networks provided in another embodiment of the invention.

A method for selecting a network from shared networks is provided in this embodiment of the invention, as shown in FIG. 6. The embodiment is applied to a context where a UE enters a shared cell and performs network selection by using an automatic network selection mode. The method includes S601 to S606.

In S601, a UE receives, in a source cell, network selection indication information broadcasted by a source base station.

The network selection indication information is for indicating the UE to select in a shared cell the equivalent home network of the UE, the home network of the UE, or a network with higher priority than that of the current registered network of the UE. The source cell is a cell were the UE currently resides, i.e., is a cell on which the UE camped before the UE enters a target shared cell. The source cell may be a shared cell, or a non-shared cell.

It should be noted that, if the source cell is a shared cell, then a source base station may broadcast, within the shard cell, network selection indication information corresponding to each shared network, or may broadcast, within the shard cell, same network selection indication information for all shared networks, which is not limited in the disclosure.

In S602, the UE stores the network selection indication information.

In S603, the UE enters a shared cell from the source cell.

The UE enters the shared cell through cell selection or cell reselection.

In S604, the UE receives, in the shared cell, network selection indication information broadcasted by a shared base station.

The network selection indication information received in the shared cell is for indicating the UE to select in a shared cell the equivalent home network of the UE, the home network of the UE, or a network with higher priority than that of the current registered network of the UE.

Furthermore, an identity of the home network of the UE broadcasted in the cell, an identity of the equivalent home network of the UE, or an identity of a network with higher priority than the current registered network of the UE is also broadcasted in the shared cell, so that the UE gets knowledge of network available for selection.

It should be noted that, the shared base station may broadcast, within the shard cell, network selection indication information corresponding to each shared network, or may broadcast, within the shared cell, same network selection indication information for all shared networks, which is not limited in the disclosure.

In S605, the UE selects a target network using the network selection indication information received in the shared cell.

In particular, the network selection indication information may carry an identity for indicating the UE whether executing a network selection policy is permitted. For example, if an identifier carried by the network selection indication information is 1, then the UE is indicated to select a target cell in the shared cell; on the contrary, if an identifier carried by the network selection indication information is 0, then the UE does not select a target cell.

Furthermore, the network selection indication information may be a time value. The UE receives the time value broadcasted in the cell by a base station, and selects a target network when a period indicated by the time value elapsed.

Optionally, the UE sets a preconfigured time according to the time value, and selects a target network at the preconfigured time or later than the preconfigured time. For example, the time value carried by the network selection indication information is 5 minutes. If the time value is received at a time A, then the UE selects a target network at time B or after the time B, where the time B is 5 minutes later than the time A.

Optionally, the UE starts a timer according to the time value, and selects a target network when the timer expires. For example, the time value carried by the network selection indication information is 5 minutes, then a timer is started when the time value is received, and the target network is selected when the timer runs to 5 minutes.

It should be noted that, if the time value is too large, then the UE can not select a target network soon, which affects user experience. Therefore, preferably, the time value may be set to be within 6 minutes.

In addition, the time value may be stored in a SIM or USIM card, or stored in the UE's own storage device.

Furthermore, the timer in the UE stops timing after the network is selected by the UE.

There may be three cases for the foregoing selecting a target network by the UE using the network selection indication information received in the shared cell:

a first case, including: selecting, by the UE using the network selection indication information, a network with highest priority from at least one equivalent home network of the UE, in a case that at least one equivalent home network of the UE is available; or, a second case, including: selecting, by the UE using the network selection indication information, the home network of the UE, in a case that none of the equivalent home networks of the UE is available and the home network of the UE is available; or, a third case, including: selecting, by the UE using the network selection indication information, a network with highest priority from at least one network with higher priority than that of the current registered network of the UE, in a case that none of the equivalent home networks of the UE and the home network of the UE is available but at least one network with higher priority than that of the current registered network of the UE is available.

It should be noted that, in the third case above, if the current registered network of the UE or a network equivalent to the current registered network of the UE has highest priority, then the current registered network of the UE or the network equivalent to the current registered network of the UE is selected (i.e., the current registered network is kept unchanged).

A network is determined to be available if following two conditions are both met:

a first condition: finding out at least one cell in the network by the UE; and a second condition: reading an identity of the network by the UE.

In S606, the UE initiates a registration procedure to the selected network after the UE selects the network.

It should be noted that, the step is omitted if the selected target network is the current registered network of the UE.

Especially, during the registering process, a message received from the UE is sent by the base station to the selected target network, and after the UE finishes the procedure of registering to the selected target network, subsequent messages received from the UE are also sent by the base station to the target network.

In addition, to prevent a "ping-pong" effect in a border area between a shared cell and a non-shared cell (frequent reselection between networks resulted from a UE's reciprocating movement in a border area), broadcasting the forgoing network selection indication information by a shared base station at the border area should be avoided.

It should be noted that, for simplicity of the description, the above method embodiment is described as a combination of a series of actions. However, those skilled in the art should know that, the disclosure is not limited to the order of the described actions. Secondly, those skilled in the art should also know that, the embodiments described in the description are all preferred embodiments, and the actions and modules involved are not necessarily required by the invention.

Thus, when the UE enters the shared cell and performs network selection by using an automatic network selection mode, it is ensured that the UE selects its home network or equivalent home network, to end a roaming state and obtain a stable and reliable local service with higher quality at lower charges; or ensuring that the UE selects a network with higher priority, to obtain a stable and reliable service with higher quality, thus improving user experience.

Figure 7:
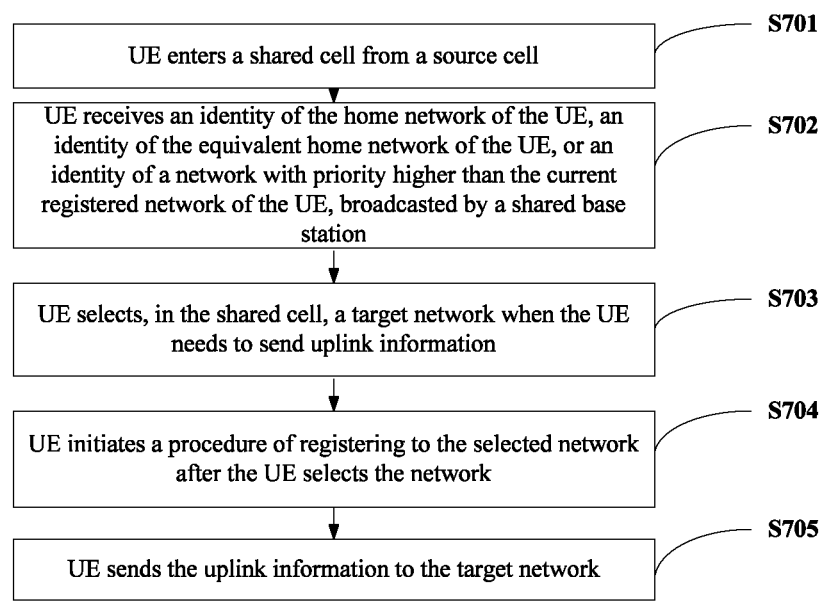
FIG. 7 is a diagram of a method for selecting a network from shared networks provided in another embodiment of the invention.

A method for selecting a network from shared networks is provided in this embodiment of the invention, as shown in FIG. 7. The embodiment is applied to a context where a UE enters a shared cell and performs network selection by using an automatic network selection mode. The method includes S701 to S705.

In S701, a UE enters a shared cell from a source cell.

The UE enters the shared cell through cell selection or cell reselection. The source cell is a cell were the UE currently resides, i.e., is a cell on which the UE camped before the UE enters a target shared cell. The source cell may be a shared cell, or a non-shared cell.

In S702, the UE receives an identity of the home network of the UE, an identity of the equivalent home network of the UE, or an identity of a network with higher priority than the current registered network of the UE, broadcasted by a shared base station.

The shared base station is a base station serving the shared cell.

In S703, the UE selects, in the shared cell, a target network when the UE needs to send uplink information.

The target network includes the equivalent home network of the UE, the home network of the UE, or a network with higher priority than that of the current registered network of the UE.

In particular, there may be three cases for the foregoing selecting a target network in the shared cell by the UE:

a first case, including: selecting, by the UE, a network with highest priority from at least one equivalent home network of the UE, in a case that at least one equivalent home network of the UE is available; or, a second case, including: selecting, by the UE, the home network of the UE, in a case that none of the equivalent home networks of the UE is available and the home network of the UE is available; or, a third case, including: selecting, by the UE, a network with highest priority from at least one network with higher priority than that of the current registered network of the UE, in a case that none of the equivalent home networks of the UE and the home network of the UE is available but at least one network with higher priority than that of the current registered network of the UE is available.

It should be noted that, in the third case above, if the current registered network of the UE or a network equivalent to the current registered network of the UE has highest priority, then the current registered network of the UE or the network equivalent to the current registered network of the UE is selected (i.e., the current registered network is kept unchanged).

A network is determined to be available if following two conditions are both met:

a first condition: finding out at least one cell in the network by the UE; and a second condition: reading an identity of the network by the UE.

It should be noted that, to prevent a "ping-pong" effect in a border area between a shared cell and a non-shared cell (frequent reselection between networks resulted from a UE's reciprocating movement in a border area), selecting a target network by the UE in the border area when the UE sends uplink information should be avoided.

In S704, the UE initiates a registration procedure to the selected network after the UE selects the network.

It should be noted that, the step is omitted if the selected target network is the current registered network of the UE.

Especially, during the registering process, a message received from the UE is sent by the base station to the selected target network, and after the UE finishes the procedure of registering to the selected target network, subsequent messages received from the UE are also sent by the base station to the target network.

In S705, the UE sends the uplink information to the target network.

It should be noted that, for simplicity of the description, the above method embodiment is described as a combination of a series of actions. However, those skilled in the art should know that, the disclosure is not limited to the order of the described actions. Secondly, those skilled in the art should also know that, the embodiments described in the description are all preferred embodiments, and the actions and modules involved are not necessarily required by the invention.

According to the method provided in the above embodiment, when the UE enters the shared cell and performs network selection by using an automatic network selection mode, the UE selects a target network in the shared cell when the UE needs to send uplink information. The signaling load during network selection is reduced, thus it is ensured that the UE selects its home network or equivalent home network, to end a roaming state and obtain a stable and reliable local service with higher quality at lower charges; or ensuring that the UE selects a network with higher priority, to obtain a stable and reliable service with higher quality, thus improving user experience.

Figure 8:
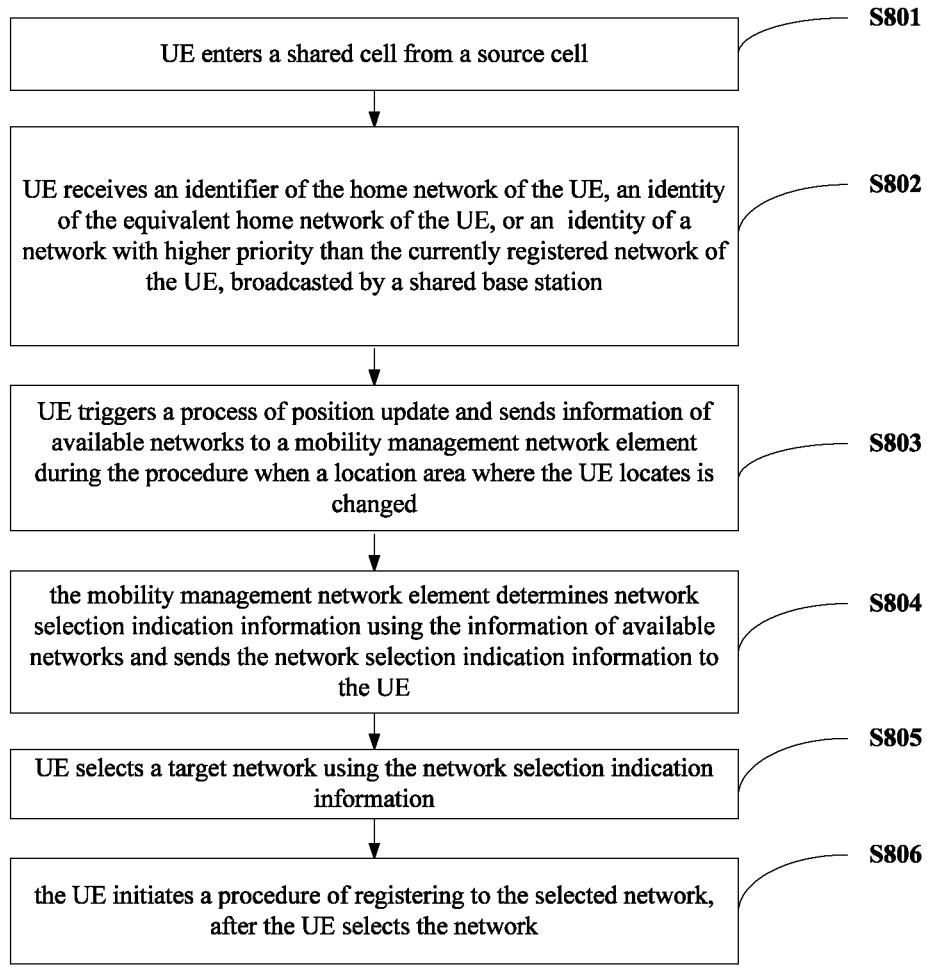
FIG. 8 is a diagram of a method for selecting a network from shared networks provided in another embodiment of the invention.

A method for selecting a network from shared networks is provided in this embodiment of the invention, as shown in FIG. 8. The embodiment is applied to a context where a UE enters a shared cell and a location area where the UE locates is changed. The method includes S801 to S806.

In S801, a UE enters a shared cell from a source cell.

The UE enters the shared cell through cell selection or cell reselection; the source cell is a cell were the UE currently resides; and the source cell may be a shared cell, or a non-shared cell.

In S802, the UE receives an identity of the home network of the UE, an identity of the equivalent home network of the UE, or an identity of a network with higher priority than the current registered network of the UE, broadcasted by a shared base station.

The shared base station is a base station serving the shared cell.

In S803, the UE triggers a procedure of location update and sends available networks information to a mobility management network element during the procedure when a location area where the UE locates is changed.

The available networks information sent to the mobility management network element by the UE includes: an identity of the home network of the UE, or an identity of the equivalent home network of the UE, the home network of the UE, or an identity of a network with higher priority than that of the current registered network of the UE, or an indication that the home network of the UE is available, or an indication that the equivalent home network of the UE is available, or an indication that a network with higher priority than that of the current registered network of the UE is available.

In S804, the mobility management network element determines network selection indication information using the available networks information and sends the network selection indication information to the UE.

The network selection indication information is for indicating the UE to select in a shared cell the equivalent home network of the UE, the home network of the UE, or a network with higher priority than that of the current registered network of the UE.

In particular, after receiving the available networks information, the mobility management network element determines, according to configuration of the mobility management network element or according to agreement reached by operators when establishing the shared cell, whether to permit the UE to select a target network, and the mobility management network element sends network selection indication information to the UE to indicate the UE to select the target network.

In S805, the UE selects a target network using the network selection indication information.

There may be three cases for the foregoing selecting a target network by the UE using the network selection indication information:

a first case, including: selecting, by the UE using the network selection indication information, a network with highest priority from at least one equivalent home network of the UE, in a case that at least one equivalent home network of the UE is available; or, a second case, including: selecting, by the UE using the network selection indication information, the home network of the UE, in a case that none of the equivalent home networks of the UE is available and the home network of the UE is available; or, a third case, including: selecting, by the UE using the network selection indication information, a network with highest priority from at least one network with higher priority than that of the current registered network of the UE, in a case that none of the equivalent home networks of the UE and the home network of the UE is available but at least one network with higher priority than that of the current registered network of the UE is available.

It should be noted that, in the third case above, if the current registered network of the UE or a network equivalent to the current registered network of the UE has highest priority, then the current registered network of the UE or the network equivalent to the current registered network of the UE is selected (i.e., the current registered network is kept unchanged).

A network is determined to be available if following two conditions are both met:

a first condition: finding out at least one cell in the network by the UE; and a second condition: reading an identity of the network by the UE.

S806, the UE initiates a registration procedure to the selected network, after the UE selects the network.

The step is omitted if the selected target network is the current registered network of the UE.

It should be noted that, a shared network deployed by the operators may cover multiple location areas, where cells in a location area are all non-shared cells or are all shared cells. Therefore, if a UE enters a shared cell from a non-shared cell, it can be deemed that the location area is changed. However, if a UE enters a shared cell from another shared cell, it is not certain that the location area is changed, so the UE triggers a procedure of location update when the location area is changed.

For simplicity of the description, the above method embodiment is described as a combination of a series of actions. However, those skilled in the art should know that, the disclosure is not limited to the order of the described actions. Secondly, those skilled in the art should also know that, the embodiments described in the description are all preferred embodiments, and the actions and modules involved are not necessarily required by the invention.

Thus, when the UE enters the shared cell and performs network selection by using an automatic network selection mode, it is ensured that the UE selects its home network or equivalent home network, to end a roaming state and obtain a stable and reliable local service with higher quality at lower charges; or ensuring that the UE selects a network with higher priority, to obtain a stable and reliable service with higher quality, thus improving user experience.

Figure 9:
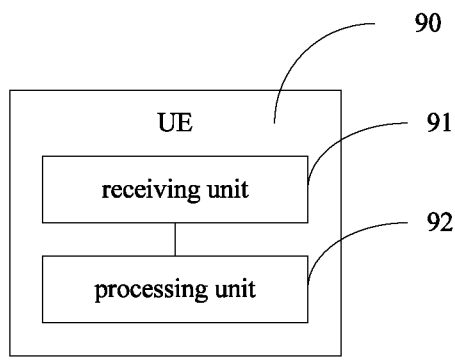
FIG. 9 is a structural diagram of a UE provided in an embodiment of the invention.

A UE 90 is provided in this embodiment, as shown in FIG. 9. The UE 90 includes:

a receiving unit 91, configured to receive network selection indication information.

The network selection indication information is for indicating the UE to select in a shared cell the equivalent home network of the UE, the home network of the UE, or a network with higher priority than that of the current registered network of the UE.

In particular, the network selection indication information may carry an identifier for indicating the UE whether executing a network selection policy is permitted. For example, the UE is indicated to select a target cell in the shared cell if an identifier carried by the network selection indication information is 1; on the contrary, the UE does not select a target cell if an identifier carried by the network selection indication information is 0.

Furthermore, the receiving unit 91 further receives, in the shared cell, an identity of the home network of the UE, an identity of the equivalent home network of the UE, or an identity of a network with higher priority than the current registered network of the UE, broadcasted in the shared cell, so that the UE gets knowledge of network available for selection.

Optionally, the receiving unit 91 is configured to receive, in the shared cell, the network selection indication information.

In particular, the UE enters the shared cell from a cell on which the UE currently camps, and receives, in the shared cell, network selection indication information broadcasted by a shared base station, and the UE selects a target network in the shared cell, where the shared base station is a base station serving the shared cell.

It should be noted that, the shared base station may broadcast, within the shard cell, network selection indication information corresponding to each shared network, or may broadcast, within the shard cell, same network selection indication information for all shared networks, which is not limited in the disclosure.

Optionally, the receiving unit 91 is configured to receive, in a source cell, the network selection indication information.

The source cell is a cell on which the UE camped before the UE entering the shared cell.

In particular, the UE receives in the shared cell and stores the network selection indication information, and the UE selects a target network using the stored network selection indication information when the UE enters a shared cell from a cell on which the UE currently camps.

It should be noted that, if the source cell is a shared cell, then a source base station may broadcast, within the shard cell, network selection indication information corresponding to each shared network, or may broadcast, within the shard cell, same network selection indication information for all shared networks, which is not limited in the disclosure.

The UE 90 includes a processing unit 92, configured to select a target network in the shared cell using the network selection indication information.

The target network is the equivalent home network of the UE, the home network of the UE, or a network with higher priority than that of the current registered network of the UE.

Furthermore, the network selection indication information is a time value; and the processing unit 92 is configured to select the target network in the shared cell when a period indicated by the time value elapsed.

Optionally, the UE sets a preconfigured time according to the time value, and selects a target network at the preconfigured time or later than the preconfigured time. For example, the time value carried by the network selection indication information is 5 minutes. If the time value is received at a time A, then the UE selects a target network at time B or after the time B, where the time B is 5 minutes later than the time A.

Optionally, the UE starts a timer according to the time value, and selects the target network when the timer expires. For example, the time value carried by the network selection indication information is 5 minutes, then a timer is started when the time value is received, and the target network is selected when the timer runs to 5 minutes.

It should be noted that, if the time value is too large, then the UE can not select a target network soon, which affects user experience. Therefore, preferably, the time value may be set to be within 6 minutes.

In addition, the time value may be stored in a SIM or USIM card, or stored in the UE's own storage device.

Furthermore, the timer in the UE stops timing after the network is selected by the UE.

Especially, in a context where the UE enters the shared cell and the location area is changed, the receiving unit 91 is configured to receive the network selection indication information sent by a mobility management network element.

Figure 10:
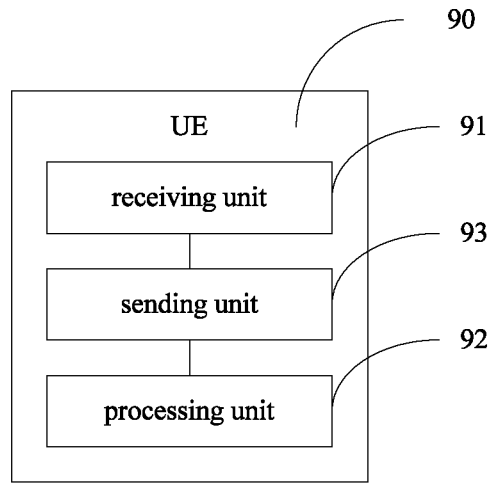
FIG. 10 is a structural diagram of a UE provided in another embodiment of the invention.

Furthermore, as shown in FIG. 10, the UE 90 further includes: a sending unit 93, configured to send, to the mobility management network element, available networks information of the UE in the shared cell before the receiving unit 91 receives the network selection indication information sent by the mobility management network element, so that the mobility management network element can determine the network selection indication information using the available networks information;

The available networks information includes: an identity of the home network of the UE, or an identity of the equivalent home network of the UE, the home network of the UE, or an identity of a network with higher priority than that of the current registered network of the UE, or an indication that the home network of the UE is available, or an indication that the equivalent home network of the UE is available, or an indication that a network with higher priority than that of the current registered network of the UE is available.

In particular, after receiving the available networks information, the mobility management network element determines, according to configuration of the mobility management network element or according to agreement reached by operators when establishing the shared cell, whether to permit the UE to select a target network, and the mobility management network element sends network selection indication information to the UE to indicate the UE to select the target network.

Furthermore, the processing unit 92 is configured to select, using the network selection indication information, a network with highest priority from at least one equivalent home network of the UE, in a case that at least one equivalent home network of the UE is available; or, the processing unit 92 is configured to select, using the network selection indication information, the home network of the UE, in a case that none of the equivalent home networks of the UE is available and the home network of the UE is available; or, the processing unit 92 is configured to select, using the network selection indication information, a network with highest priority from at least one network with higher priority than that of the current registered network of the UE, in a case that none of the equivalent home networks of the UE and the home network of the UE is available but at least one network with higher priority than that of the current registered network of the UE is available.

A network is determined to be available if following two conditions are both met:

a first condition: finding out at least one cell in the network by the UE; and a second condition: reading an identity of the network by the UE.

According to the UE provided in the above embodiment, when the UE enters the shared cell and performs network selection by using an automatic network selection mode, the UE is ensured to select, in the share cell, the home network or equivalent home network of the UE using received network selection indication information, to end a roaming state and obtain a stable and reliable local service with higher quality at lower charges; or ensuring that the UE selects a network with higher priority, to obtain a stable and reliable service with higher quality, thus improving user experience.

Those skilled in the art can clearly understand that, for convenience and concision in the description, a corresponding process in a foregoing embodiment may be referred to, for a detailed operation process of the above UE, which is not repeated here.

Figure 11:
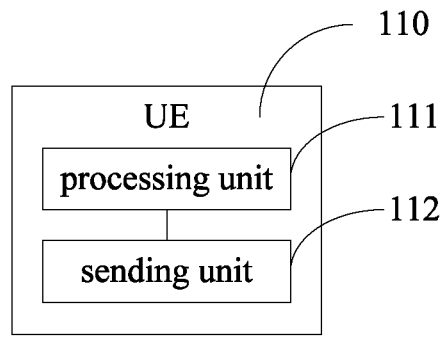
FIG. 11 is a structural diagram of a UE provided in another embodiment of the invention.

A UE 110 is provided in this embodiment, as shown in FIG. 11. The UE 110 includes:

a processing unit 111, configured to select a target network in a shared cell, when uplink information is required to be sent.

The target network includes the equivalent home network of the UE, the home network of the UE, or a network with higher priority than that of the current registered network of the UE.

And the UE 110 includes a sending unit 112, configured to send the uplink information to the target network.

Furthermore, the processing unit 111 is configured to select a network with highest priority from at least one equivalent home network of the UE, in a case that at least one equivalent home network of the UE is available; or, the processing unit 111 is configured to select the home network of the UE, in a case that none of the equivalent home networks of the UE is available and the home network of the UE is available; or, the processing unit 111 is configured to select a network with highest priority from at least one network with higher priority than that of the current registered network of the UE, in a case that none of the equivalent home networks of the UE and the home network of the UE is available but at least one network with higher priority than that of the current registered network of the UE is available.

A network is determined to be available if following two conditions are both met:

a first condition: finding out at least one cell in the network by the UE; and a second condition: reading an identity of the network by the UE.

It should be noted that, to prevent a "ping-pong" effect in a border area between a shared cell and a non-shared cell (frequent reselection between networks resulted from a UE's reciprocating movement in a border area), selecting a target network by the UE in the border area when the UE sends uplink information should be avoided.

In particular, after the processing unit selects a network, the UE initiates a registration procedure to the selected network, and sends uplink information to the target network via the sending unit.

According to the UE provided in the above embodiment, when the UE enters the shared cell and performs network selection by using an automatic network selection mode, it is ensured that the UE selects a target network in the shared cell when the UE needs to send uplink information. The signaling load during network selection is reduced. Thus, it is ensured that the UE selects its home network or equivalent home network, to end a roaming state and obtain a stable and reliable local service with higher quality at lower charges; or it is ensured that the UE selects a network with high priority, to obtain a stable and reliable service with higher quality, thus improving user experience.

Those skilled in the art can clearly understand that, for convenience and concision in the description, a corresponding process in a foregoing embodiment may be referred to, for a detailed operation process of the above UE, which is not repeated here.

Figure 12:
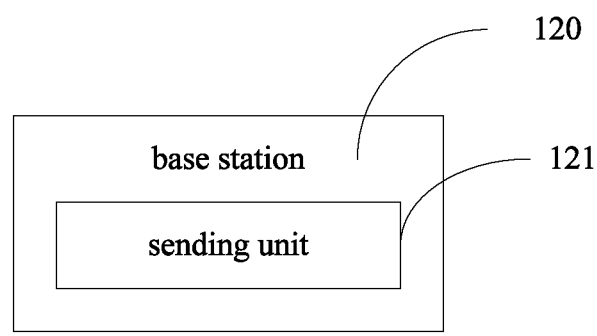
FIG. 12 is a structural diagram of a base station provided in an embodiment of the invention.

A base station 120 is provided in this embodiment, as shown in FIG. 12. The base station 120 includes:

a sending unit 121, configured to broadcast, in a cell, network selection indication information.

The network selection indication information is for indicating a user equipment UE to select a target network in a shard cell, where the target network includes the equivalent home network of the UE, the home network of the UE, or a network with higher priority than that of the current registered network of the UE.

In particular, the network selection indication information may carry an identifier for indicating the UE whether executing a network selection policy is permitted. For example, the UE is indicated to select a target cell in the shared cell if an identifier carried by the network selection indication information is 1; on the contrary, the UE does not select a target cell if an identifier carried by the network selection indication information is 0.

Optionally, the cell is the shared cell.

In this case, the base station is a shared base station, and the shared base station is a base station serving the shared cell.

In particular, the UE enters the shared cell form a source shell, and receives network selection indication information broadcasted in the shared cell by the base station, then the UE selects a target network using the network selection indication information.

It should be noted that, the shared base station may broadcast, within the shard cell, network selection indication information corresponding to each shared network, or may broadcast, within the shard cell, same network selection indication information for all shared networks, which is not limited in the disclosure.

Figure 13:
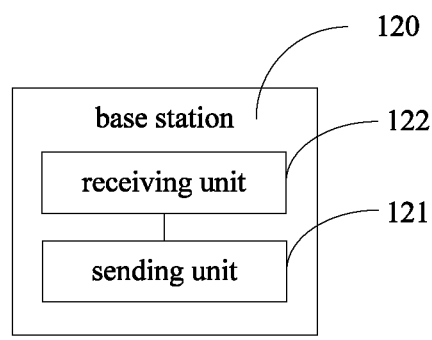
FIG. 13 is a structural diagram of a base station provided in another embodiment of the invention.

Furthermore, as shown in FIG. 13, the base station 120 further includes:

a receiving unit 122, configured to receive a message sent from the UE; and the sending unit 121 is further configured to send the message received by the receiving unit 122 to the target network.

In particular, after selecting the target network, the UE initiates a procedure of registering to the selected target network, and during the registering process, a message received from the UE is sent by the base station to the selected target network, and after the UE finishes the procedure of registering to the selected target network, subsequent messages received from the UE are also sent by the base station to the target network.

Optionally, the cell is a cell on which the UE camped before the UE entering the shared cell.

In this case, the cell on which the UE camped before the UE entering the shared cell may be a source cell, the base station may be a source base station, and the source cell may be a shared cell, or a non-shared cell, which are not limited here.

In particular, the UE receives in the source cell the network selection indication information broadcasted in the source cell by the base station and stores the network selection indication information, and the UE selects a target network using the network selection indication information when the UE enters the shared cell from the source cell.

It should be noted that, if the source cell is a shared cell, then the base station may broadcast, within the shard cell, network selection indication information corresponding to each shared network, or may broadcast, within the shard cell, same network selection indication information for all shared networks, which is not limited in the disclosure.

In addition, to prevent a "ping-pong" effect in a border area between a shared cell and a non-shared cell (frequent reselection between networks resulted from a UE's reciprocating movement in a border area), broadcasting the forgoing network selection indication information by a base station at the border area should be avoided.

Optionally, the network selection indication information includes a time value, for indicating the UE to select in the shared cell the target network when a period indicated by the time value elapsed.

Optionally, the UE sets a preconfigured time according to the time value, and selects a target network at the preconfigured time or later than the preconfigured time. For example, the time value carried by the network selection indication information is 5 minutes. If the time value is received at a time A, then the UE selects a target network at time B or after the time B, where the time B is 5 minutes later than the time A.

Optionally, the UE starts a timer according to the time value, and selects a target network when the timer expires. For example, the time value carried by the network selection indication information is 5 minutes, then a timer is started when the time value is received, and the target network is selected when the timer runs to 5 minutes.

It should be noted that, if the time value is too large, then the UE can not select a target network soon, which affects user experience. Therefore, preferably, the time value may be set to be within 6 minutes.

In addition, the time value may be stored in a SIM or USIM card, or stored in the UE's own storage device.

Furthermore, the timer in the UE stops timing after the network is selected by the UE.

There may be three cases for selecting a target network by the UE using the network selection indication information:

a first case, including: selecting, by the UE using the network selection indication information, a network with highest priority from at least one equivalent home network of the UE, in a case that at least one equivalent home network of the UE is available; or, a second case, including: selecting, by the UE using the network selection indication information, the home network of the UE, in a case that none of the equivalent home networks of the UE is available and the home network of the UE is available; or, a third case, including: selecting, by the UE using the network selection indication information, a network with highest priority from at least one network with higher priority than that of the current registered network of the UE, in a case that none of the equivalent home networks of the UE and the home network of the UE is available but at least one network with higher priority than that of the current registered network of the UE is available.

It should be noted that, in the third case above, if the current registered network of the UE or a network equivalent to the current registered network of the UE has highest priority, then the current registered network of the UE or the network equivalent to the current registered network of the UE is selected (i.e., the current registered network is kept unchanged).

A network is determined to be available if following two conditions are both met:

a first condition: finding out at least one cell in the network by the UE; and a second condition: reading an identity of the network by the UE.

It should be noted that, in the embodiment, the source base station may be a non-shared base station, or a shared base station.

In addition, to prevent a "ping-pong" effect in a border area between a shared cell and a non-shared cell (frequent reselection between networks resulted from a UE's reciprocating movement in a border area), broadcasting the forgoing network selection indication information by a base station at the border area should be avoided.

By using the base station provided in the above embodiment, a UE selects a target network using network selection indication information broadcasted by the base station when the UE enters the shared cell and performs network selection in an automatic network selection mode, avoiding a case that the UE prefers a current registered network rather than performs network selection even if the UE is within coverage of the home network of the UE, the equivalent home network of the UE, or a network with higher priority than that of the current registered network of the UE. Thus, it is ensured that the UE selects its home network or equivalent home network, to end a roaming state and obtain a stable and reliable local service with higher quality at lower charges; or it is ensured that the UE selects a network with high priority, to obtain a stable and reliable service with higher quality, thus improving user experience.

Those skilled in the art can clearly understand that, for convenience and concision in the description, a corresponding process in a foregoing embodiment may be referred to, for a detailed operation process of the above base station, which is not repeated here.

Figure 14:
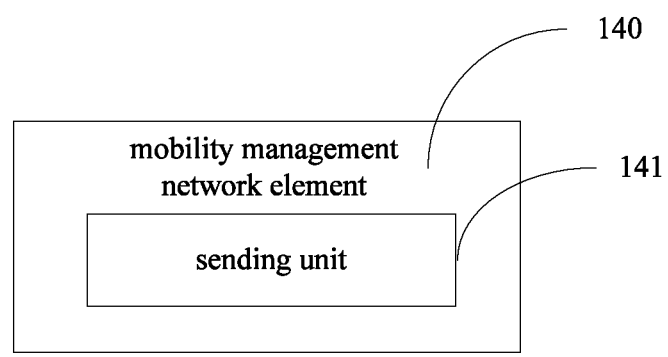
FIG. 14 is a structural diagram of a mobility management network element provided in an embodiment of the invention.

A mobility management network element 140 is provided in the embodiment of the invention, as shown in FIG. 14. The mobility management network element is applied to a context where a UE enters a shared cell and the location area is changed, and the mobility management network element includes:

a sending unit 141, configured to send network selection indication information to a UE.

The network selection indication information is for indicating the UE to select a target network in a shared cell, where the target network includes the equivalent home network of the UE, the home network of the UE, or a network with higher priority than that of the current registered network of the UE.

In particular, the network selection indication information may carry an identifier for indicating the UE whether executing a network selection policy is permitted. For example, the UE is indicated to select a target cell in the shared cell if an identifier carried by the network selection indication information is 1; on the contrary, the UE does not select a target cell if an identifier carried by the network selection indication information is 0.

Furthermore, the network selection indication information may be a time value. The UE receives the time value broadcasted in the cell by a base station, and selects a target network when a period indicated by the time value elapsed.

Optionally, the UE sets a preconfigured time according to the time value, and selects a target network at the preconfigured time or later than the preconfigured time. For example, the time value carried by the network selection indication information is 5 minutes. If the time value is received at a time A, then the UE selects a target network at time B or after the time B, where the time B is 5 minutes later than the time A.

Optionally, the UE starts a timer according to the time value, and selects a target network when the timer expires. For example, the time value carried by the network selection indication information is 5 minutes, then a timer is started when the time value is received, and the target network is selected when the timer runs to 5 minutes.

It should be noted that, if the time value is too large, then the UE can not select a target network soon, which affects user experience. Therefore, preferably, the time value may be set to be within 6 minutes.

In addition, the time value may be stored in a SIM or USIM card, or stored in the UE's own storage device.

Furthermore, the timer in the UE stops timing after the network is selected by the UE.

Figure 15:
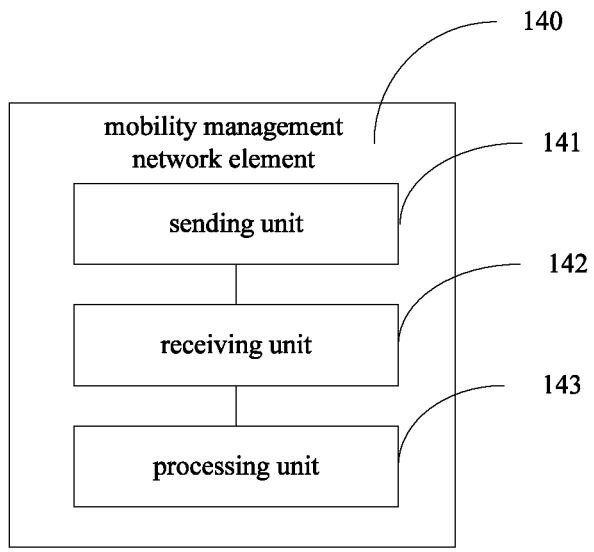
FIG. 15 is a structural diagram of another mobility management network element provided in an embodiment of the invention.

Optionally, as shown in FIG. 15, the mobility management network element 140 further includes: a receiving unit 142, configured to receive from the UE, available networks information of the UE in the shared cell, before the sending unit 141 sends network selection indication information to the UE; and a processing unit 143, configured to determine the network selection indication information using the available networks information received by the receiving unit 142;

The available networks information includes: an identity of the home network of the UE, or an identity of the equivalent home network of the UE, the home network of the UE, or an identity of a network with higher priority than that of the current registered network of the UE, or an indication that the home network of the UE is available, or an indication that the equivalent home network of the UE is available, or an indication that a network with higher priority than that of the current registered network of the UE is available.

Furthermore, there may be three cases for selecting a target network in the shared cell by the UE using the network selection indication information:

a first case, including: selecting, by the UE using the network selection indication information, a network with highest priority from at least one equivalent home network of the UE, in a case that at least one equivalent home network of the UE is available; or, a second case, including: selecting, by the UE using the network selection indication information, the home network of the UE, in a case that none of the equivalent home networks of the UE is available and the home network of the UE is available; or, a third case, including: selecting, by the UE using the network selection indication information, a network with highest priority from at least one network with higher priority than that of the current registered network of the UE, in a case that none of the equivalent home networks of the UE and the home network of the UE is available but at least one network with higher priority than that of the current registered network of the UE is available.

It should be noted that, in the third case above, if the current registered network of the UE or a network equivalent to the current registered network of the UE has highest priority, then the current registered network of the UE or the network equivalent to the current registered network of the UE is selected (i.e., the current registered network is kept unchanged).

A network is determined to be available if following two conditions are both met:

a first condition: finding out at least one cell in the network by the UE; and a second condition: reading an identity of the network by the UE.

It should be noted that, a shared network deployed by the operators may cover multiple location areas, where cells in a location area are all non-shared cells or are all shared cells. Therefore, if a UE enters a shared cell from a non-shared cell, it can be deemed that the location area is changed. However, if a UE enters a shared cell from another shared cell, it is not certain that the location area is changed, so the UE triggers a procedure of location update when the location area is changed.

By using the mobility management network element provided in the above embodiment, in a context where the UE enters a shared cell and the location area is changed, when the UE enters the shared cell and performs network selection by using an automatic network selection mode, the UE selects a home network or equivalent home network using network selection indication information sent from the mobility management network element, to end a roaming state and obtain a stable and reliable local service with higher quality at lower charges, or, the UE is ensured to select a network with higher priority, to obtain a stable and reliable service with higher quality, thus improving user experience.

Those skilled in the art can clearly understand that, for convenience and concision in the description, a corresponding process in a foregoing embodiment may be referred to for a detailed operation process of the above mobility management network element, which is not repeated here.

Figure 16:
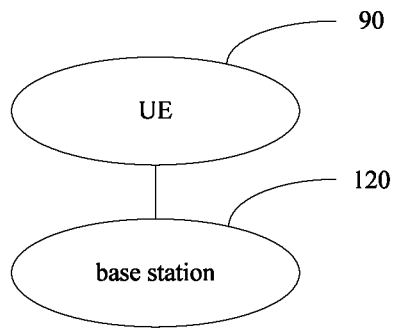
FIG. 16 is a system for network selection provided in an embodiment of the invention.

A system for selecting a network from shared networks is provided in FIG. 16, and the system includes: the foregoing UE 90 and base station 120.

By using the system provided in the above embodiment, when a UE enters a shared cell and performs network selection by using an automatic network selection mode, a base station sends a broadcast message to indicate the UE to perform network selection, avoiding a case that the UE prefers a current registered network rather than performs network selection even if the UE is within coverage of the home network of the UE, the equivalent home network of the UE, or a network with higher priority than that of the current registered network of the UE. Thus, it is ensured that the UE selects the target network, to end a roaming state and obtain a stable and reliable local service with higher quality at lower charges; or it is ensured that the UE selects a network with higher priority, to obtain a stable and reliable service with higher quality, thus improving user experience.

Figure 17:
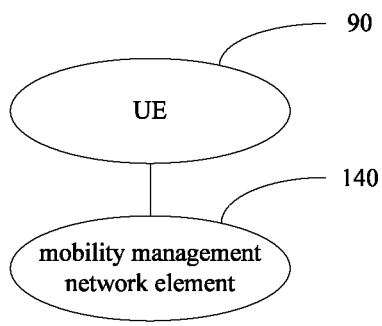
FIG. 17 is another system for network selection provided in an embodiment of the invention.

A system for selecting a network from shared networks is provided in FIG. 17, and the system includes: the foregoing UE 90 and mobility management network element 140.

By using the system provided in the above embodiment, in a context where a UE enters a shared cell and the location area is changed, when the UE enters the shared cell and performs network selection by using an automatic network selection mode, the UE selects, using network selection indication information sent by the mobility management network element, a home network or an equivalent home network, to end a roaming state and obtain a stable and reliable local service with higher quality at lower charges; or, the UE is ensured to select a network with higher priority, to obtain a stable and reliable service with higher quality, thus improving user experience.

It should be noted that, the above described communication system may be a global system for mobile communications (GSM), a code division multiple access (CDMA) system, a time division multiple access (TDMA) system, a wideband code division multiple access wireless (WCDMA), a frequency division multiple addressing (FDMA) system, an orthogonal frequency-division multiple access (OFDMA) system, a single carrier FDMA (SC-FDMA) system, a general packet radio service (GPRS) system, a long term evolution (LTE) system, or another similar communication system.

Although specific embodiments of the invention are described above, the scope of the disclosure is not limited thereto. Any modification or substitution occurs to those skilled in the art within the technical scope disclosed in the disclosure should be covered within the scope of the disclosure. Therefore, the scope of the disclosure is defined by the appended claims.

The invention claimed is:

1. A user equipment UE comprising:
   a receiver that prior to joining a target network in a shared cell, receives network selection indication information generated by a base station after determining by the base station whether to permit the UE to select the target network in the shared cell, wherein the network selection indication information provides an indication to instruct the UE to select in the shared cell among one of: an equivalent home network of the UE, a home network of the UE, or a network with higher priority than that of a current registered network of the UE; and
   a processor that selects the target network in the shared cell using the network selection indication information, wherein the target network is selected from among one of: the equivalent home network of the UE, the home network of the UE, or the network with higher priority than that of the current registered network of the UE, wherein the target network selected to be joined by the UE enables the UE to operate in the shared cell, reliably and stably at a lower cost.

2. The UE according to claim 1, wherein the receiver is configured to receive, in the shared cell, the network selection indication information.

3. The UE according to claim 1, wherein the receiver is configured to receive, in a source cell, the network selection indication information, and the source cell is a cell on which the UE camped before the UE entering the shared cell.

4. The UE according claim 1, wherein the network selection indication information is a time value; and
   the processor is configured to select the target network in the shared cell when a period indicated by the time value elapsed.

5. The UE according to claim 1, wherein the receiver is configured to receive the network selection indication information sent by a mobility management network element.

6. The UE according to claim 5, wherein the UE further comprises: a transmitter that sends to the mobility management network element, available networks information of the UE in the shared cell, before the receiver receives the network selection indication information sent by the mobility management network element, so that the mobility management network element determines the network selection indication information using the available networks information;
   wherein the available networks information comprises:
   an identity of the home network of the UE;
   an identity of the equivalent home network of the UE;
   an identity of a network with higher priority than that of the current registered network of the UE;
   an indication that the home network of the UE is available;
   an indication that the equivalent home network of the UE is available; or
   an indication that a network with higher priority than that of the current registered network of the UE is available.

7. The UE according to claim 1, wherein the processor is configured to select, using the network selection indication information, a network with highest priority from at least one equivalent home network of the UE, in a case that at least one equivalent home network of the UE is available; or,
   configured to select the home network of the UE using the network selection indication information, in a case that none of the equivalent home networks of the UE is available and the home network of the UE is available; or,
   configured to select, using the network selection indication information, a network with highest priority from at least one network with higher priority than that of the current registered network of the UE, in a case that none of the equivalent home networks of the UE and the home network of the UE is available but at least one network with higher priority than that of the current registered network of the UE is available.

8. A base station comprising:
   a processor that executes code stored in a non-transitory memory to configure the base station to perform network selection for a user equipment (UE); and
   a transmitter that broadcasts in a cell, network selection indication information, wherein the network selection indication information is to instruct the UE prior to joining a target network in a shared cell, to select the target network in the shared cell, wherein the target network comprises an equivalent home network of the UE, a home network of the UE, or a network with higher priority than that of a current registered network of the UE; and
   wherein the processor is configured to generate the network selection indication information after determining by the base station whether to permit the UE to select the target network in the shared cell, wherein the target network selected to be joined by the UE enables the UE to operate in the shared cell, reliably and stably at a lower cost.

9. The base station according to claim 8, wherein the cell is the shared cell.

10. The base station according to claim 9, further comprising:
    a receiver that receives a message sent from the UE; and
    wherein the transmitter is further configured to send to the target network the message received by the receiving unit.

11. The base station according to claim 8, wherein the cell is a cell on which the UE camped before the UE entering the shared cell.

12. The base station according to claim 8, wherein the network selection indication information comprises a time value, for indicating the UE to select the target network in the shared cell when a period indicated by the time value elapsed.

* * * * *